(12) United States Patent
Ramaswamy et al.

(10) Patent No.: US 7,428,403 B2
(45) Date of Patent: Sep. 23, 2008

(54) BI-DIRECTIONAL COMMUNICATION APPARATUS

(75) Inventors: Kumar Ramaswamy, Plainsboro, NJ (US); Edward Allen Hall, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1110 days.

(21) Appl. No.: 10/029,645

(22) Filed: Dec. 21, 2001

(65) Prior Publication Data

US 2003/0119440 A1 Jun. 26, 2003

(51) Int. Cl.
*H04H 1/00* (2006.01)
(52) U.S. Cl. .................. 455/3.01; 455/3.02; 455/3.05; 455/3.06; 455/12.1; 455/13.1; 455/416
(58) Field of Classification Search ................ 455/3.01, 455/3.02, 3.05, 3.06, 12, 13, 416
See application file for complete search history.

(56) References Cited

U.S. PATENT DOCUMENTS

| | | | | |
|---|---|---|---|---|
| 4,509,198 A | | 4/1985 | Nagatomi | 455/4 |
| 5,437,052 A | * | 7/1995 | Hemmie et al. | 725/73 |
| 5,471,219 A | | 11/1995 | Rodeffer et al. | 342/359 |
| 5,638,422 A | * | 6/1997 | Roman | 455/562.1 |
| 5,774,788 A | | 6/1998 | Hannah et al. | 458/12.1 |
| 5,805,975 A | | 9/1998 | Green, Sr. et al. | 455/3.2 |
| 5,825,327 A | * | 10/1998 | Krasner | 342/357.09 |
| 5,878,034 A | * | 3/1999 | Hershey et al. | 370/321 |
| 5,926,744 A | | 7/1999 | Fukuzawa et al. | 455/3.2 |
| 5,983,071 A | | 11/1999 | Gagon et al. | 455/3.2 |
| 5,999,794 A | | 12/1999 | Loyer | 455/3.2 |
| 6,016,120 A | | 1/2000 | McNabb et al. | 342/357.06 |
| 6,052,558 A | * | 4/2000 | Cook et al. | 455/12.1 |
| 6,122,482 A | | 9/2000 | Green, Sr. et al. | 455/3.2 |
| 6,272,351 B1 | * | 8/2001 | Langston et al. | 455/507 |
| 6,393,281 B1 | * | 5/2002 | Capone et al. | 455/428 |
| 6,510,317 B1 | * | 1/2003 | Marko et al. | 455/428 |
| 6,760,384 B1 | * | 7/2004 | Garreau et al. | 375/260 |
| 2001/0021185 A1 | * | 9/2001 | Heusala | 370/352 |
| 2002/0113686 A1 | * | 8/2002 | Shannon Carravallah | 340/5.61 |
| 2002/0140617 A1 | * | 10/2002 | Luly et al. | 343/781 CA |
| 2002/0157115 A1 | * | 10/2002 | Lu | 725/131 |
| 2002/0160708 A1 | * | 10/2002 | Hane et al. | 455/3.06 |

* cited by examiner

*Primary Examiner*—Nay Maung
*Assistant Examiner*—Janelle N. Young
(74) *Attorney, Agent, or Firm*—Joseph J. Laks; Robert D. Shedd; Brian J. Cromarty

(57) ABSTRACT

An apparatus includes a first signal receiving module, a second signal receiving module, and a signal transmitting module. The first signal receiving module is coupled between a first signal point and a third signal point for receiving a first RF signal from the first signal point. The first signal receiving module down-converts the first RF signal for providing a first down-converted signal at the third signal point. The second signal receiving module is coupled between a second signal point and the third signal point for receiving a second RF signal. The second signal receiving module down-converts said second RF signal for providing a second down-converted signal at the third signal point. The signal transmitting module is coupled between the first and second signal points and the third signal point for receiving a third RF signal from the third signal point. The signal transmitting module up-converts the third RF signal for selectively providing an up-converted signal at one of the first and second signal points in response to a selection signal.

19 Claims, 3 Drawing Sheets

BI-DIRECTIONAL COMMUNICATION APPARATUS

BACKGROUND

1. Field of the Invention

The present invention concerns a bi-directional radio frequency (RF) communication apparatus, which is particularly suitable for use in an interactive satellite television system.

The use of satellites to distribute television signals is known in the broadcasting industry and has helped revolutionize television distribution systems. The first generation of satellite television systems have employed communication satellites that encircle the earth in so-called "geosynchronous" orbits, meaning that the satellites encircle the earth and appear to be stationary relative to fixed points on earth. Such geosynchronous satellites typically maintain a high altitude which enables a single satellite to distribute television signals to entire continents or large portions of continents.

2. Background Information

The next generation of satellite television systems propose use of low earth orbit ("LEO") satellites which occupy much lower orbits than geosynchronous satellites. In particular, a LEO satellite system is conducive for providing various interactive services, such as interactive television services, internet services (e.g., electronic mail, web surfing, etc.) and the like, since the round-trip signal propagation time between an LEO satellite and a receiving location on the earth is substantially less than that in a geosynchronous satellite system. However, because of their lower orbits, multiple LEO satellites are required in order to distribute signals to a particular geographical area which may sufficiently be covered by only a single satellite in case of a geosynchronous satellite system. Accordingly, the use of multiple LEO satellites requires that a user's system be capable of tracking a plurality of moving satellites and receiving signals from such satellites without any disruption. Thus, a user's system should include a plurality of signal receiving modules which corresponds to the respective plurality of LEO satellites and requires that these receiving modules operate in a coordinated manner. In addition, in order to accommodate the interactive services, it is also desirable for a user's system to include a means for transmitting signals to the satellites. The present invention addresses these and other issues.

SUMMARY

In accordance with an aspect of the invention, an apparatus includes first signal receiving module, second signal receiving module, and a signal transmitting module. The first signal receiving module is coupled between a first signal point and a third signal point for receiving a first RF signal from the first signal point. The first signal receiving module down-converts the first RF signal for providing a first down-converted signal at the third signal point. The second signal receiving module is coupled between a second signal point and the third signal point for receiving a second RF signal. The second signal receiving module down-converts the second RF signal for providing a second down-converted signal at the third signal point. The signal transmitting module is coupled between the first and second signal points and the third signal point for receiving a third RF signal from the third signal point. The signal transmitting module up-converts the third RF signal for selectively providing an up-converted signal at one of the first and second signal points in response to a selection signal.

In accordance with another aspect of the present invention, a method for processing signals comprises the steps of receiving a first RF signal provided at a first signal point; down-converting said first RF signal for providing a first down-converted signal at a third signal point; receiving a second RF signal provided at a second signal point; down-converting the second RF signal for providing a second down-converted signal at the third signal point; receiving a third RF signal provided at the third signal point; and up-converting the third RF signal for selectively providing an up-converted signal at one of said first and second signal points in response to a selection signal.

The exemplifications set out herein illustrate preferred embodiments of the invention, and such exemplifications are not to be construed as limiting the scope of the invention in any manner.

DESCRIPTION OF THE PREFERRED EMBODIMENTS

This application discloses an apparatus which includes a first signal receiving means, such as first signal receiver; a second signal receiving means, such as a second signal receiver; and a signal transmitting means, such as a signal transmitter. The first signal receiving module is coupled between a first signal point, such as a first signal terminal, and a third signal point, such as a third signal terminal, for receiving a first RF signal, such as a first microwave television signal, from the first signal point. The first signal receiving means down-converts the first RF signal for providing a first down-converted signal at a lower frequency, such as a first IF signal in the L band, at the third signal point. The second signal receiving means, such as a second signal receiver, is coupled between a second signal point, such as a second signal terminal, and the third signal point for receiving a second RF signal, such as a second microwave television signal. The second signal receiving means down-converts the second RF signal for providing a second down-converted signal at a lower frequency, such as a second IF signal in the L band, at the third signal point. The signal transmitting means is coupled between the first and second signal points and the third signal point for receiving a third RF signal, such as an RF signal supplied from an indoor unit, from the third signal point. The signal transmitting means up-converts the third RF signal for selectively providing an up-converted signal at a higher frequency, such as a microwave signal in the Ka band, at one of the first and second signal points in response to a selection signal.

The apparatus may be included in an outdoor unit which is connected to an indoor unit of an interactive television system via transmission medium, such as a coaxial cable. The apparatus may further include an antenna control means, such as antenna control module, which generates the selection signal in response to a control signal generated by the indoor unit. A GPS signal can be utilized for controlling the directions of respective first and second antennas, which antennas provide the first and second RF signals respectively. Such an GPS signal may be transmitted to the antenna control means from the indoor unit via the same transmission medium simultaneously with other signals which includes at least one of the first down-converted signal, the second down-converted signal, the third RF signal, and the control signal. A method performed by the foregoing apparatus is also disclosed herein.

Figure 1:
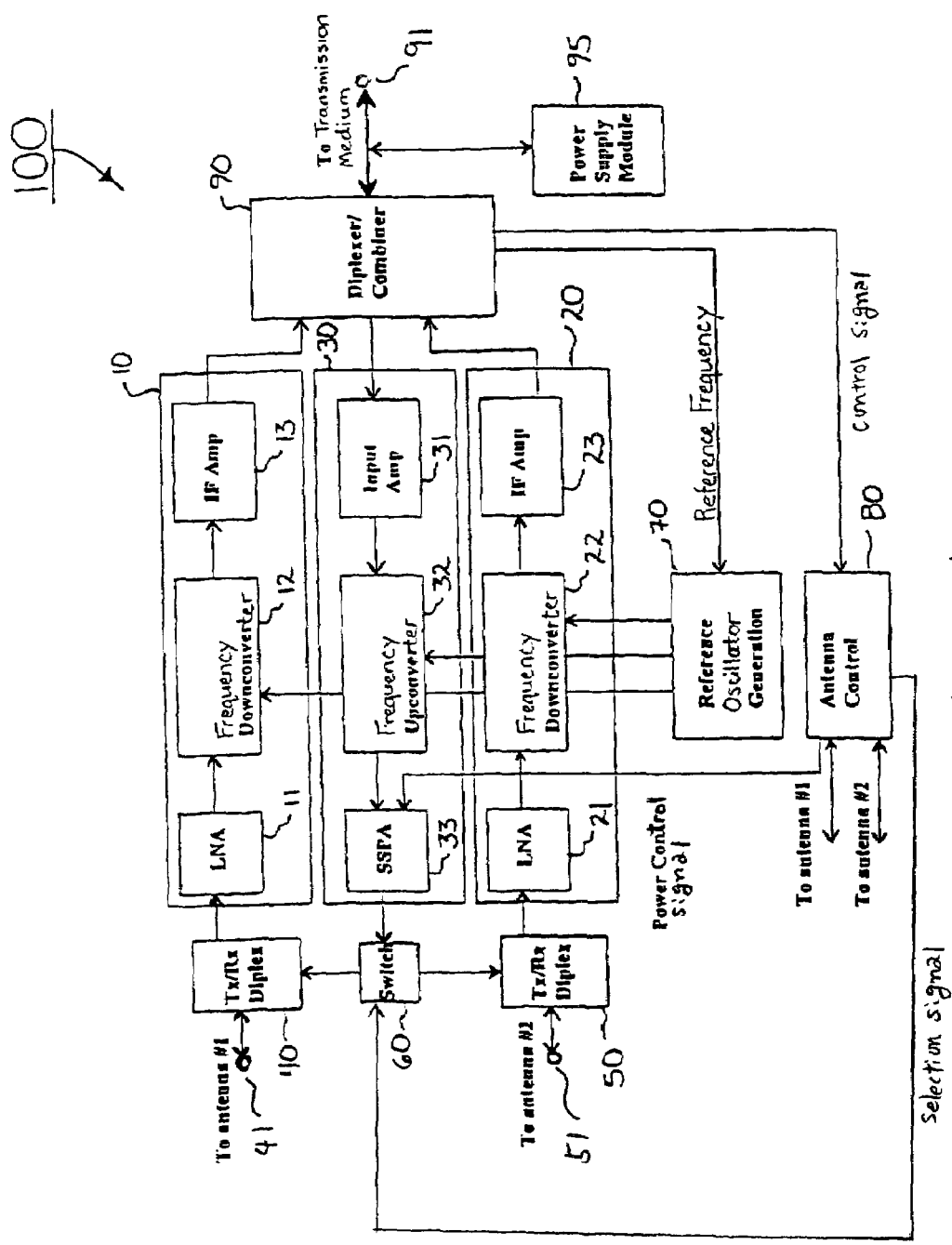
FIG. 1 shows, in block diagram form, an embodiment of an apparatus constructed according to principles of the present invention.

Referring now to the drawings, and more particularly to FIG. 1, a block diagram of an exemplary apparatus 100 constructed according to principles of the present invention is shown. Apparatus 100 of FIG. 1 may represent a component of a user's television equipment, and is suitable for use in a satellite television system having interactive services, or other signal distribution system that provides interactive services such as a multi-point, multi-channel distribution system (MMDS). In particular, apparatus 100 may be utilized as an outdoor unit for providing a communication interface between two antennas (not expressly shown in FIG. 1) and another apparatus 300 (shown in FIG. 3) which performs functions such as signal tuning, demodulation, modulation, application processing, etc.

Apparatus 100 of FIG. 1 comprises a first signal receiving means such as first signal receiver 10, a second signal receiving means such as second signal receiver 20, a signal transmitting means such as signal transmitter 30, signal transmitting/receiving (Tx/Rx) diplexers 40 and 50, switch 60, reference oscillator generation unit 70, antenna control electronics 80, diplexer/combiner 90, and power supply module 95.

First signal receiver 10 comprises low noise amplifier (LNA) 11, frequency down-converter 12 and intermediate frequency (IF) amplifier 13. Similarly, second signal receiver 20 comprises LNA 21, frequency down-converter 22 and IF amplifier 23. Signal transmitter 30 comprises input amplifier 31, frequency up-converter 32, and solid state power amplifier (SSPA) 33.

In operation, first and second signal receivers 10 and 20 simultaneously receive and process signals provided from first and second antennas represented in FIG. 1 as antenna #1 and antenna #2, respectively. The received signals may be provided from a satellite and/or other signal distribution source, and may, for example, be television signals, internet protocol (IP) signals and/or other types of signals.

Signals provided from the first antenna are received by signal Tx/Rx diplexer 40 and input to LNA 11 of first signal receiver 10. LNA 11 amplifies the received signals and provides amplified signals to frequency down-converter 12 for frequency down-conversion. According to an exemplary embodiment, frequency down-converter 12 operates to convert the amplified signals from microwave RF signals (e.g., in Ka or Ku frequency band) to IF signals in the L band (900 MHz-1.4 GHz). The down-converted IF signals from frequency down-converter 12 are input to IF amplifier 13 which performs a signal amplification operation thereon. Amplified signal outputs from IF amplifier 13 are provided to diplexer/combiner 90 which outputs the signals to a transmission medium such as a coaxial cable, optical fiber cable or other communication link. Signals output to the transmission medium are provided to another apparatus 300 (shown in FIG. 3) which will described later herein.

In a similar manner, signals provided from the second antenna are received by signal Tx/Rx diplexer 50 and input to LNA 21 of second signal receiver 20. LNA 21 amplifies the received signals and provides amplified signals to frequency down-converter 22 for frequency down-conversion. According to an exemplary embodiment, frequency down-converter 22 operates to convert the amplified signals from microwave RF signals (e.g., in Ka or Ku frequency band) to IF signals in the L band (900 MHz-1.4 GHz). The down-converted IF signals from frequency down-converter 22 are input to IF amplifier 23 which performs a signal amplification operation thereon. Amplified signal outputs from IF amplifier 23 are provided to diplexer/combiner 90 which outputs the signals to the transmission medium for input to apparatus 300 of FIG. 3. As will be explained later herein, first and second signal receivers 10 and 20 down-convert signals to two different frequency bands, thereby enabling their respective output signals to be staggered in frequency onto the transmission medium. In this manner, the transmission medium can simultaneously transmit signals from both first and second signal receivers 10 and 20 to apparatus 300 of FIG. 3.

Figure 3:
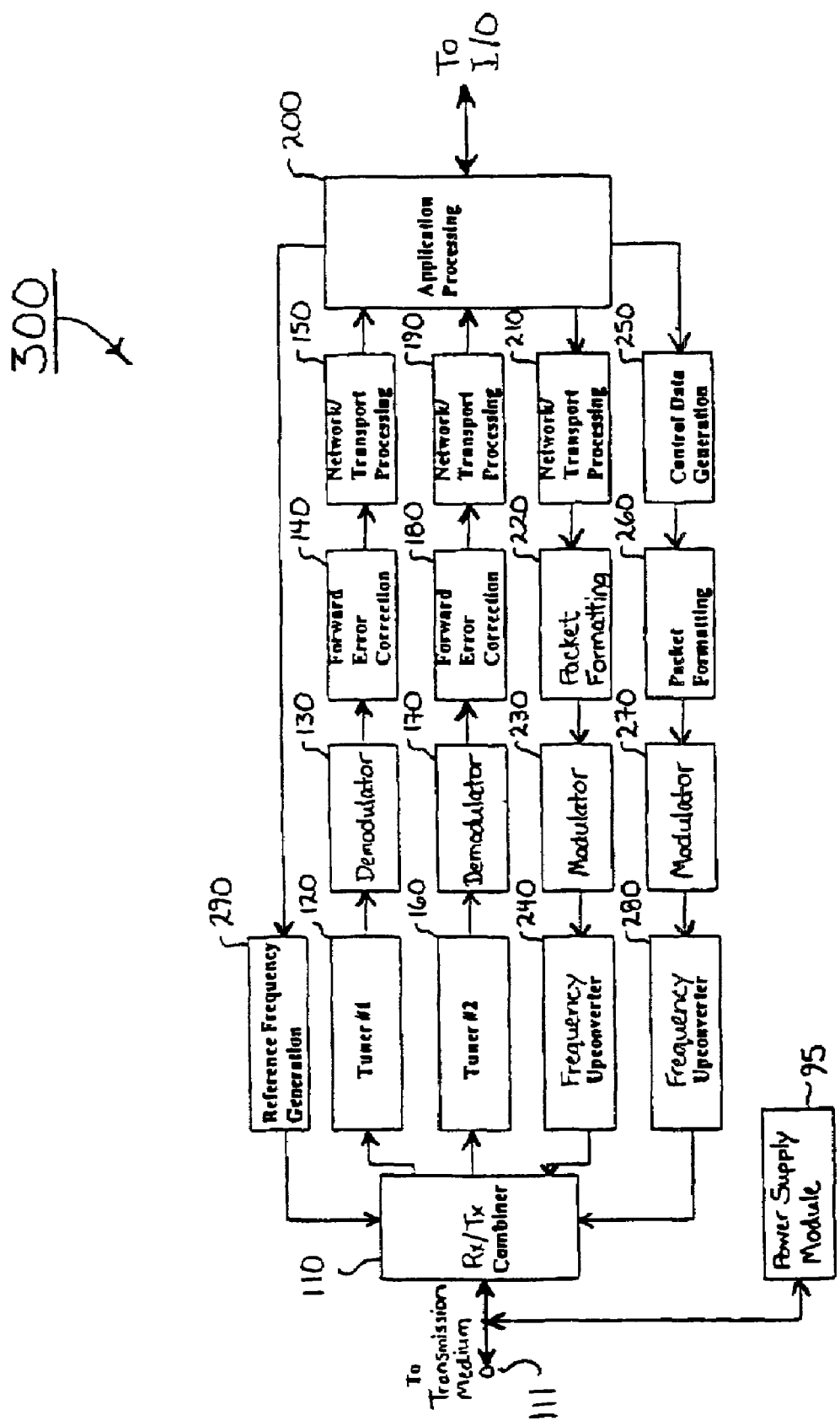
FIG. 3 shows, in block diagram form, an embodiment of an apparatus constructed according to principles of the present invention.

Signal transmitter 30 provides first apparatus 100 with a signal transmitting function to accommodate, among other things, interactive services such as interactive television services, internet services and the like. In operation, signals from apparatus 300 of FIG. 3 are provided to signal transmitter 30 for transmission via the transmission medium and diplexer/combiner 90. The signals may, for example, be interactive television signals, internet protocol (IP) signals and/or other types of signals. Input amplifier 31 receives the signals provided from diplexer/combiner 90 and performs an amplification operation thereon. The amplified outputs from input amplifier 31 are provided to frequency up-converter 32 for frequency up-conversion (e.g., to the uplink frequency of the Ka band, which is approximately 30 GHz). Frequency converted signals from frequency up-converter 32 are input to SSPA 33 for amplification.

As indicated in FIG. 1, antenna control 80 provide a power control signal to SSPA 33 to control a signal amplification operation thereof. In particular, the power control signal controls the extent to which SSPA 33 amplifies the power of signals received from frequency up-converter 32. Amplified signals from SSPA 33 are provided to switch 60, which selectively outputs the amplified signals to either signal Tx/Rx diplexer 40 or 50. In this manner, signals output from signal transmitter 30 are provided to either the first antenna (i.e., antenna #1) or the second antenna (i.e., antenna #2) for transmission. Antenna control 80 generates a selection signal to control switch 60 in such a way that the same antenna is used for both transmission and reception at a particular point in time. The determination of which one of the antennas to use for transmission is made by antenna control 80 in response to the control signal generated in apparatus 300 of FIG. 3 based upon the information including one provided from the first and second satellites via the first and second RF signals respectively. In particular, the control signal includes information concerning, for example, the relative locations of one or more satellites. In addition, antenna control 80 receives through separate communication paths (i.e., to antenna #1/to antenna #2 of FIG. 1) the information from the first and/or second antennas representing operating conditions of the antennas, such as the directional positions of the first and/or second antennas. Antenna control 80 can also send signals to the first and second antennas through the aforementioned signal paths to, for example, control the directional positions of the antennas. While the output signals from signal transmitter 30 may be transmitted to a satellite, such as an LEO satellite, it is also contemplated that such signals may be transmitted to another destination, such as an MMDS station or other destination.

Also in FIG. 1, reference oscillator generation unit 70 receives a reference frequency input from apparatus 300 of FIG. 3 via diplexer/combiner 90. The reference frequency input provides a reference signal to synchronize all frequency translations and provide adjustment corrections for Doppler shift, thermal drift, and other frequency errors. Reference oscillator generation unit 70 uses the reference frequency information provided from apparatus 300 of FIG. 3 to control the frequency conversions performed by frequency down-converters 12 and 22 and frequency up-converter 32. Apparatus 100 receives electrical power from power supply module 95 which preferably includes a direct-current-to-direct-current (DC-DC) converter to generate different voltage levels.

Figure 2:
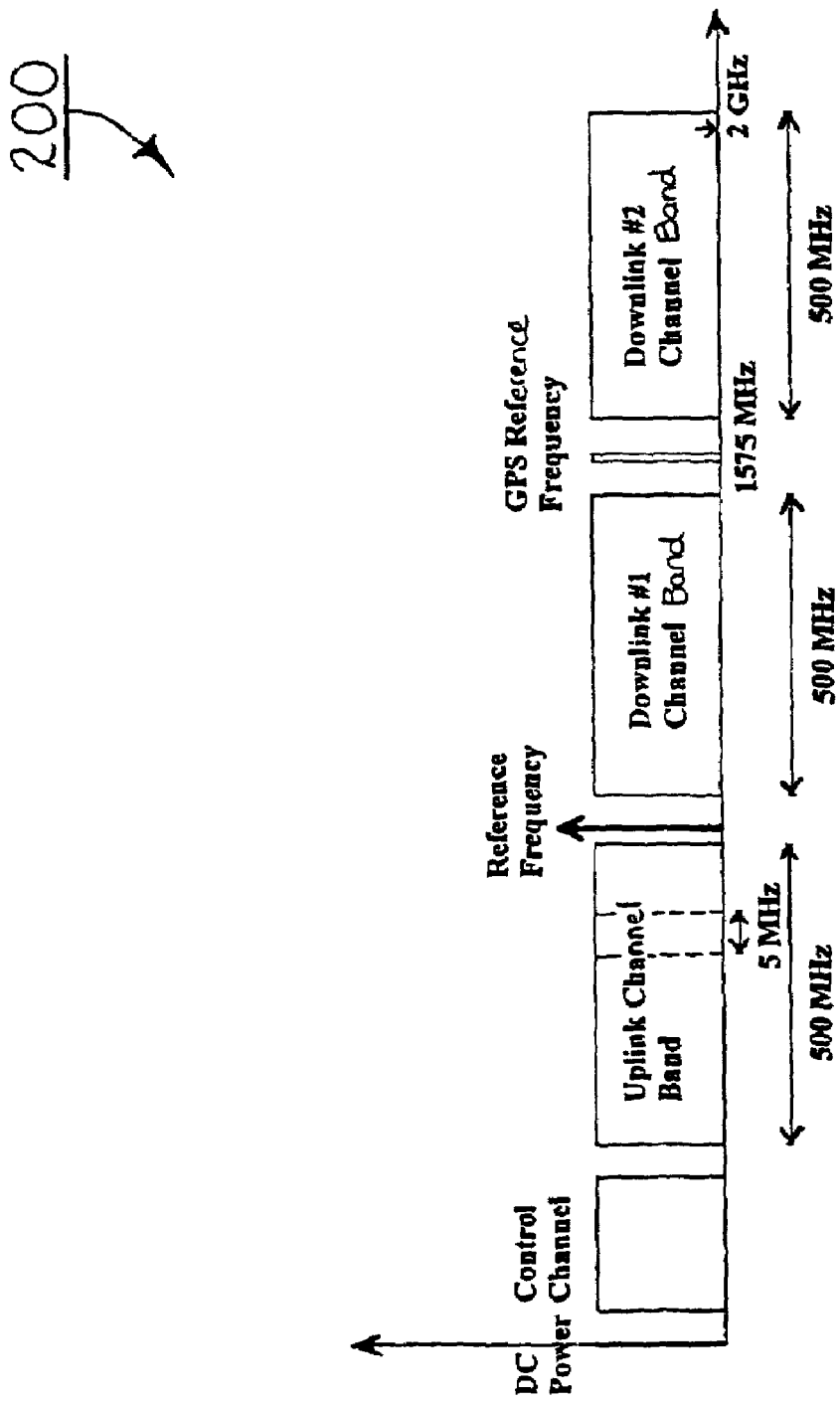
FIG. 2 illustrates an exemplary frequency spectrum arrangement in accordance with principles of the present invention.

FIG. 2 illustrates an exemplary frequency spectrum arrangement 200 in accordance with principles of the present invention. In particular, the frequency spectrum arrangement 200 of FIG. 2 shows the frequency bands of signals relative to a DC power level as the signals pass through diplexer/combiner 90 of FIG. 1. Signals provided to diplexer/combiner 90 from first and second signal receivers 10 and 20 are allocated different frequency bands represented in FIG. 2 as downlink #1 channel band and downlink #2 channel band, respectively. That is, signals from first signal receiver 10 are within the downlink #1 channel band, and signals from second signal receiver 20 are within the downlink #2 channel band. Moreover, signals provided to signal transmitter 30 from diplexer/combiner 90 are allocated yet another frequency band represented in FIG. 2 as the uplink channel band. According to an exemplary embodiment, the two downlink channel bands and the uplink channel band are each allocated 500 MHz of bandwidth. As shown in FIG. 2, the transmission channel within the uplink channel band has an exemplary bandwidth of 5 MHz per subscriber, and is placed within the uplink channel band with frequency pre-correction to avoid interference among subscribers. Other bandwidths may of course be utilized in accordance with principles of the present invention. The particular transmission channel assigned to a given subscriber may be adaptively controlled by signals received from one or more satellites or other signal distribution sources.

Frequency spectrum arrangement 200 of FIG. 2 also includes a control channel for providing the control signals which represent information such as the relative locations of one or more satellites, operating conditions of the first and second antennas, power control data (for SSPA 33), etc. According to an exemplary embodiment, the control signal is a digitally modulated signal (e.g., using digital frequency modulation such as frequency shift keyed (FSK) modulation or quadrature phase shift keyed (QPSK) modulation). Placement of the control channel within the frequency spectrum arrangement 200 is a matter of design choice. For example, the control channel may be allocated a frequency band below the uplink channel band as shown in FIG. 2, or may alternatively be allocated a different frequency band such as one above the downlink #2 channel band.

Also in FIG. 2, the frequency spectrum arrangement 200 includes a global positioning system (GPS) reference frequency which carries GPS signals from multiple GPS satellites representing their respective positions. The GPS signals are used to generate the control signals that identify satellite locations, thereby enabling satellite tracking to be performed. As shown in FIG. 2, the GPS reference frequency is assigned an exemplary frequency of 1575 MHz. The reference frequency information provided to reference oscillator generation unit 70 of FIG. 1 is also included within the frequency spectrum arrangement 200 of FIG. 2.

Use of the frequency spectrum arrangement 200 of FIG. 2 is particularly advantageous since the staggered frequency allocations allow multiple signals to be simultaneously transmitted over the transmission medium between apparatus 100 of FIG. 1 and apparatus 300 of FIG. 3. In particular, first and second signal receivers 10 and 20 of FIG. 1 can simultaneously transmit received signals to apparatus 300 of FIG. 3, while apparatus 300 concurrently transmits signals for transmission to signal transmitter 30 of FIG. 1. In fact, first and second signal receivers 10 and 20 simultaneously transmit the down-converted signals especially during a transition period, where apparatus 100 switches between the two satellites, in order to receive signals from the satellites without disruption. In addition, the control signal, GPS signals and reference frequency signals may also be transmitted over the same transmission medium couples between apparatus 100 of FIG. 1 and apparatus 300 of FIG. 3.

Referring to FIG. 3, a block diagram of an exemplary apparatus 300 constructed according to principles of the present invention is shown. Apparatus 300 of FIG. 3 represents another component of a user's television equipment, and is suitable for use in a satellite television system having interactive services, or other signal distribution system that provides interactive services such as a MMDS. In particular, apparatus 300 may be utilized as an indoor unit connected to apparatus 100 of FIG. 1 via the transmission medium.

The apparatus 300 of FIG. 3 comprises a plurality of processing channels which communicate with the apparatus 100 of FIG. 1 via the transmission medium. In FIG. 3, a Rx/Tx combiner 110 is coupled between the processing channels and the transmission medium. A first processing channel processes signals provided from first signal receiver 10 of FIG. 1. The first processing channel comprises first tuner 120 represented in FIG. 3 as tuner #1, demodulator 130, forward error correction unit 140, and network/transport processing unit 150. A second processing channel processes signals provided from second signal receiver 20 of FIG. 1. The second processing channel comprises second tuner 160 represented in FIG. 3 as tuner #2, demodulator 170, forward error correction unit 180, and network/transport processing unit 190. The signals processed by the first and second processing channels of FIG. 3 are provided to application processing unit 200 which performs processing operations and exchanges signals with an input/output (I/O) means, such as a display, input terminal, etc.

Also in FIG. 3, a third processing channel receives processed signals from application processing unit 200, performs further processing operations upon the received signals, and provides the resulting signals to signal transmitter 30 of FIG. 1 for transmission. The third processing channel comprises network/transport processing unit 210, packet formatting unit 220, modulator 230 and frequency up-converter 240. A fourth processing channel receives processed signals from application processing unit 200, performs further processing operations upon the received signals to generate the control signals, and provides the control signals to apparatus 100 of FIG. 1. The fourth processing channel comprises control data generation unit 250, packet formatting unit 260, modulator 270 and frequency up-converter 280. Apparatus 300 also includes reference frequency generation unit 290 which receives signals from application processing unit 200 and generates the reference frequency input for reference oscillator generation unit 70 of FIG. 1. Generation of the reference frequency is preferably based on information provided from the satellites (e.g., GPS signals), thereby enabling a Doppler correction to be represented in the generated reference frequency.

In operation, apparatus 300 of FIG. 3 simultaneously receives and processes signals provided from first and second signal receivers 10 and 20 of FIG. 1. Concurrently, apparatus 300 generates signals for transmission via signal transmitter 30 of FIG. 1, and also generates the control signal. As previously indicated, all of these signals can be simultaneously transmitted over the transmission medium due to their staggered frequency bands.

Regarding the first processing channel of FIG. 3, signals provided from first signal receiver 10 of FIG. 1 are provided to first tuner 120 via the transmission medium and Rx/Tx combiner 110. First tuner 120 performs a signal tuning operation on the received signals and provides tuned output signals to demodulator 130. Demodulator 130 demodulates the output signals provided from first tuner 120 to generate and output demodulated signals. According to an exemplary embodiment, demodulator 130 is adapted to demodulate digital signals having a plurality of different formats, such as bi-phase shift keyed (BPSK) signals, quadrature phase shift keyed (QPSK) signals, quadrature amplitude modulated (QAM) signals, etc. Forward error correction unit 140 performs an error correction operation upon the demodulated signals provided from demodulator 130, and outputs error corrected signals. Network/transport processing unit 150 receives the error corrected signals output from forward error correction unit 140, parses the signals into bitstreams corresponding to signal type (e.g., audio, video, control, internet, etc.), and provides output of the various bitstreams. Application processing unit 200 receives the bitstreams from network/transport processing unit 150 and processes the bitstreams according to signal type. Processed outputs from application processing unit 200 may be provided to I/O means.

Regarding the second processing channel of FIG. 3, signals provided from second signal receiver 20 of FIG. 1 are provided to second tuner 160 via the transmission medium and Rx/Tx combiner 110. Second tuner 160 performs a signal tuning operation on the received signals and provides tuned output signals to demodulator 170. Demodulator 170 demodulates the output signals provided from second tuner 160 to generate and output demodulated signals. According to an exemplary embodiment, demodulator 170 is adapted to demodulate digital signals having a plurality of different formats, such as bi-phase shift keyed (BPSK) signals, quadrature phase shift keyed (QPSK) signals, quadrature amplitude modulated (QAM) signals, etc. Forward error correction unit 180 performs an error correction operation upon the demodulated signals provided from demodulator 170, and outputs error corrected signals. Network/transport processing unit 190 receives the error corrected signals output from forward error correction unit 180, parses the signals into bitstreams corresponding to signal type (e.g., audio, video, control, internet, etc.), and provides output of the various bitstreams. Application processing unit 200 receives the bitstreams from network/transport processing unit 190 and processes the bitstreams according to signal type. Processed outputs from application processing unit 200 may be provided to I/O means.

Regarding the third processing channel of FIG. 3, processed signals from application processing unit 200 are provided to network/transport processing unit 210 which parses the signals into bitstreams corresponding to signal type (e.g., audio, video, control, internet, etc.), and provides output of the various bitstreams. Packet formatting unit 220 receives the bitstreams output from network/transport processing unit 210, and assembles the received bitstreams into packets of digital data. Modulator 230 receives the packets of digital data from packet formatting unit 220 and modulates the received data packets to generate and output modulated signals. According to an exemplary embodiment, modulator 230 is adapted to modulate signals into a plurality of different formats, such as bi-phase shift keyed (BPSK) signals, quadrature phase shift keyed (QPSK) signals, quadrature amplitude modulated (QAM) signals, etc. Frequency up-converter 240 receives the modulated signals from modulator 230 and performs a frequency up-conversion operation thereon. In particular, frequency up-converter 240 up-converts the received signals to a frequency within the uplink channel band shown in FIG. 2. The frequency up-converted signals generated from frequency up-converter 240 are output to Rx/Tx combiner 110 and provided to signal transmitter 30 of FIG. 1 via the transmission medium.

Regarding the fourth processing channel of FIG. 3, processed signals from application processing unit 200 are provided to control data generation unit 250 which generates control data corresponding to the control signals. Packet formatting unit 260 receives the control data generated by control data generation unit 250 and assembles the control data into packets of digital data. Modulator 270 receives the packets of digital data from packet formatting unit 260 and modulates the received data packets to generate and output modulated control signals. According to an exemplary embodiment, modulator 270 is adapted to modulate signals into a plurality of different formats, such as bi-phase shift keyed (BPSK) signals, quadrature phase shift keyed (QPSK) signals, quadrature amplitude modulated (QAM) signals, etc. Frequency up-converter 280 receives the modulated control signals from modulator 270 and performs a frequency up-conversion operation thereon. In particular, frequency up-converter 280 up-converts the received control signals to a frequency within the control channel band shown in FIG. 2. The frequency up-converted control signals generated from frequency up-converter 280 are output to Rx/Tx combiner 110 and provided to apparatus 100 of FIG. 1 via the transmission medium. Like apparatus 100 of FIG. 1, apparatus 300 of FIG. 3 also receives electrical power from power supply module 95.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. An apparatus, comprising:
   a first connection to a first antenna, said first antenna operative to receive a first RF signal from a first satellite and to transmit a third RF signal to said first satellite;
   a second connection to a second antenna, said second antenna operative receive a second RF signal from a first satellite and to transmit said third RF signal to said second satellite;
   a third connection to a signal processor;
   a first signal receiving means coupled between said first connection to said first antenna and said third connection to said signal processor for receiving a first RF signal, said first signal receiving means down-converting said first RF signal for providing a first down-converted signal at said third connection to said signal processor;
   a second signal receiving means coupled between said second connection to said second antenna and said third connection to said signal processor for receiving a second RF signal, said second signal receiving means down-converting said second RF signal for providing a second down-converted signal at said third connection to said signal processor; and a signal transmitting means coupled between said first and second connections to said first and second antennas and said third connection to said signal processor for receiving a third RF signal from said third connection to said signal processor, said signal transmitting means up-converting said third RF signal for selectively providing an up-converted signal at one of said first and second connections to said first and second antennas in response to a selection signal wherein said first down-converted signal, said second down-converted signal, and said third RF signal are present at said third connection to said signal processor simultaneously.

2. The apparatus of claim 1, further comprising: control means for generating said selection signal in response to a control signal from an indoor unit.

3. The apparatus of claim 1, further comprising: control means for generating said selection signal in response to a control signal from an indoor unit.

4. The apparatus of claim 3, wherein said control signal is being present at said third connection to said signal processor simultaneously with said first down-converted signal, said second down-converted signal and said third RF signal.

5. The apparatus of claim 4, wherein a GPS signal is being present simultaneously at said third connection to said signal processor with said control signal, said first down-converted signal, said second down-converted signal and said third RF signal.

6. The apparatus of claim 1, wherein said first RF signal includes one of a television signal and an internet protocol signal.

7. The apparatus of claim 1, wherein said second RF signals includes one of a television signal and an internet protocol signal.

8. The apparatus of claim 1, wherein said first and second RF signals are signals transmitted from respective satellites.

9. The apparatus of claim 1, wherein said first and second RF signals are transmitted from respective terrestrial signal distribution source.

10. A method for processing signals, comprising the steps of:

receiving a first RF signal provided at a first antenna said first antenna operative to receive said first RF signal from a first satellite and to transmit a third RF signal to said first satellite;

down-converting said first RF signal for providing a first down-converted signal at a signal point;

receiving a second RF signal provided at a second antenna said second antenna operative to receive said second RF signal from a second satellite and to transmit said third RF signal to said second satellite;

down-converting said second RF signal for providing a second down-converted signal at said signal point;

receiving said a third RF signal provided at said signal point; and up-converting said third RF signal for selectively providing an up-converted signal at one of said first and second antennas in response to a selection signal.

11. The method of claim 10, wherein said first down-converted signal, said second down-converted signal and said third RF signal are being present at said signal point simultaneously.

12. The method of claim 11, further comprising the step of: generating said selection signal in response to a control signal from an indoor unit.

13. The method of claim 10, further comprising the step of: generating said selection signal in response to a control signal from an indoor unit.

14. The method of claim 12, wherein said control signal is being present at said signal point simultaneously with said first down-converted signal, said second down-converted signal and said third RF signal.

15. The method of claim 14, wherein a GPS signal is being present simultaneously at said signal point with said control signal, said first down-converted signal; said second down-converted signal and said third RF signal.

16. The method of claim 10, wherein said first RF signal includes one of a television signal and an internet protocol signal.

17. The method of claim 10, wherein said second RF signals includes one of a television signal and an internet protocol signal.

18. The method of claim 10, wherein said first and second RF signals are signals transmitted from respective satellites.

19. The method of claim 10, wherein said first and second RF signals are transmitted from respective terrestrial signal distribution sources.

* * * * *